May 26, 1936.  F. A. BARNES  2,042,166

PRESSURE TIGHT BEARING

Filed April 29, 1933

INVENTOR
FREDERICK A. BARNES
BY
Raymond W. Junkins
ATTORNEY

Patented May 26, 1936

2,042,166

UNITED STATES PATENT OFFICE 2,042,166

PRESSURE-TIGHT BEARING

Frederick A. Barnes, Cleveland Heights, Ohio, assignor to Bailey Meter Company, a corporation of Delaware Application April 29, 1933, Serial No. 668,613

5 Claims. (Cl. 308—36.2)

The present invention relates to a pressure-tight bearing, particularly adapted for use in meters, pressure gages, and the like; where the fluid pressure within the casing, in the wall of which the bearing is formed, is greater or less than that of the atmosphere as, for example, in the case of a differential pressure gage where the pressure operated device is inside of a fluid tight casing, while the indicating or recording mechanism is outside, thus necessitating the passage of a shaft, spindle or equivalent translating device through the wall of the casing.

In many such meters or instruments, the pressure differentials available for imparting motion to the spindle are very small compared to the static pressure within the casing, against which it is necessary to seal. It is, therefore, essential that the friction or opposition to the movement of the spindle in the bearing be reduced to the greatest possible extent. The use of an ordinary stuffing gland or a cup leather packing is objectionable for this reason, the former because of the friction due to the pressure needed to keep the packing tight, and the latter because of the fact that the pressure itself acts upon the cup leather to keep the bearing tight.

Many types of bearings have been utilized and some have been satisfactory in connection with low static pressures, for example, up to 300 lb. per sq. in. gage, within the casing. However, present day problems call for the metering or measuring of pressures or differential pressures where the static pressure within the meter casing may be from 1500 to 3000 lb. per sq. in., and under these conditions, it is extremely difficult, if not impossible, with prior bearings, to maintain a pressure-tight bearing having a minimum of frictional resistance to the movement of the spindle passing through the bearing.

A primary object of my invention consists in a design of pressure-tight bearings having new and improved features and commercially successful. I illustrate and describe as a preferred embodiment, the use of the pressure-tight bearing in connection with a fluid rate-of-flow meter having a casing within which the fluid meter parts are subjected to static pressure which may become of the order of 3,000 lb. per sq. in. and are positioned by pressure differentials which may be in the order of 100 inches of water or less, for imparting angular motion to a spindle extending through the wall of the casing and upon which spindle an indicating pointer or recording pen is positioned external of the casing. It will be understood, of course, that the features and advantages of my invention are not limited to the particular modification illustrated and described.

Figure 1:
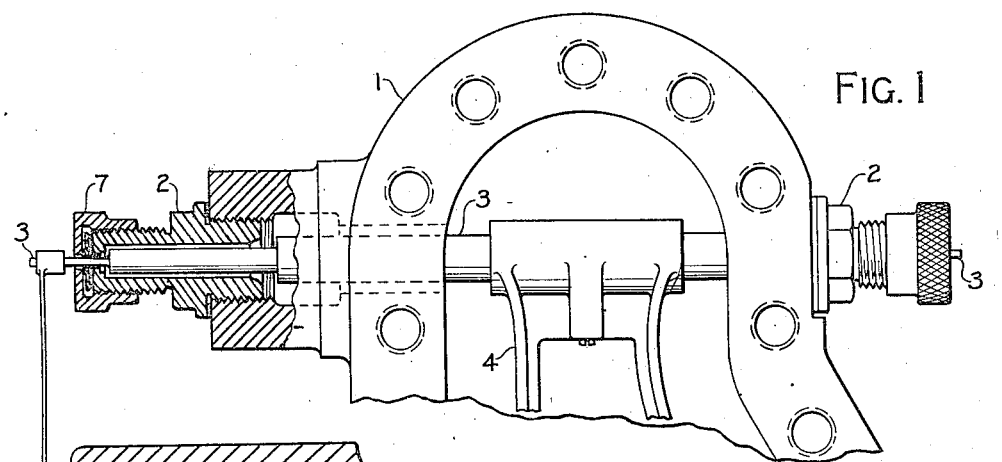
Fig. 1 illustrates a plan view, partially in section, of a part of a fluid meter embodying the invention.

In the construction shown, the bearing is made double or duplicated, that is, the spindle extending entirely through a portion of the casing, having bearings at opposite ends so that the spindle is balanced, that is, relieved from any end thrust which would result if one end of the spindle were subjected to a pressure greater than the other end. Herein both ends of the spindle are subjected to atmospheric pressure.

I have shown the invention as applied to a differential pressure gage, or flow meter, a portion of which is shown as in the form of a chamber 1, into the side walls of which are screw-threaded bearing supports or bodies 2, each externally threaded at its projecting end. A spindle 3, which is angularly moved through a total travel of, for example, 40°, is actuated or angularly moved from the inside of the chamber by means of any suitable pressure receiving device, through the agency of an arm or lever 4 and extends in opposite direction through the supporting bodies 2, the openings in which are slightly larger than the spindle, which is, therefore, not in frictional contact with the walls of the body.

The actual bearing for the spindle is formed in a flat bearing piece of pliable material indicated at 5, or similar resilient or semi-plastic material which has sufficient stiffness to act as a bearing when compressed, or a high grade oil treated chrome tanned leather. The spindle tightly fits a hole through the bearing piece so that the bearing piece constitutes the entire and only bearing for the spindle 3, and in connection with the related parts, forms a pressure-tight bearing between the relatively high static pressure within the casing 1 and the atmosphere.

I preferably make the bearing piece of a resilient, semi-plastic pliable material as I have found that such material has certain advantages when used in connection with the other improved parts of my bearing support and construction. The material used is not only pliable but has a slight tendency to cold flow and conform itself to irregular spaces, as will be described in detail. The bearing piece is punched or cut as a disc from a flat sheet of this material of about 1/32 of an inch in thickness and is provided with a centrally located hole very closely matched in diameter to the spindle 3. The outside or greatest diameter of the disc is loosely matched to the recess of a metallic follower piece 6, of special shape but roughly in the form of a recessed disc having a centrally located hole adapted for clearance relative to the spindle. The bearing piece 5 may be lightly coated on its periphery with a suitable cement, after which it is gently pressed into the recess of the follower 6.

As the bearing is assembled, the piece 5 is slightly greater in thickness than the depth of the recess in the follower 6 so that the piece 5 engages in full face the flat end of the body 2 when the piece 5 and follower 6 in assembly are slid over the end of the spindle 3 toward the end of the body 2. An internally screw-threaded cap 7, having a centrally located hole with considerable clearance relative to the spindle 3, is next moved over the spindle 3 and screw-threaded onto the external portion of the body 2 in a manner clearly shown in the drawing. As the cap 7 is screwed onto the body 2, the inner surface of the head of the cap surrounding the spindle 3, as at 8, engages a raised or projecting part of the follower 6 immediately surrounding the spindle 3, moving the bearing piece 5 and follower 6 along the spindle 3 toward the end of the body 2 until the bearing piece 5 engages in full face contact the end of the body 2.

Continued threading of the cap 7 onto the body 2 forces the follower 6 toward the body and causes the bearing piece 5 to cold flow into all parts of the recess of the follower 6 and assume a shape as clearly shown in the drawing, completely filling the recess of the follower 6 when said follower engages in substantial line contact, as at 9, the end of the body 2.

Rotation of the cap 7 onto the body 2 provides through a minimum of engaging surface between the cap 7 and the follower 6, of a minimum tendency to rotation of the follower 6, or of lateral movement of the follower and bearing piece 5 relative to the spindle 3, or in fact, any motion of the bearing piece 5 other than compression thereof, and such compression is concentrated, due to the preferred construction of the follower 6, at an area closely adjacent the engagement of the bearing piece 5 with the spindle 3. If the complete or major portion of the greatest diameter of the follower 6 were in engagement with the inner surface of the cap 7, any rotation of the cap 7 after it had engaged the follower 6 would tend to rotate the follower and simultaneously the bearing piece 5 with possible lateral motion of the bearing piece relative to the spindle 3 and a tendency toward an enlargement of the spindle engaging hole through the bearing piece.

The compression or force expended by screwing the cap 7 onto the body 2, at the point of engagement 8, is transmitted to the bearing piece 5 closely adjacent its engagement with the spindle 3, and tends to compress or tightly hold the bearing piece immediately surrounding the spindle, allowing the rest of the bearing piece to cold flow or completely fill and conform to the interior of the recess of the follower 6. Furthermore, the sectional design of the follower 6 is such that it has a decided beam action about its pivoting point or line of contact 9, tending to roll on such point of contact and greatly increase the possibility of a maximum of compression available upon the piece 5 closely adjacent the spindle.

The interior of the piece 6, or what might be termed the bottom of the recess, may be straight or otherwise formed, although I have preferably shown it as having a ridge 10 approximately one-half the radius of the recess, which tends to strengthen the beam section, tends to prevent movement of the pliable material from the spindle toward the outermost part of the recess, and furthermore, occupies space which it is not necessary, then, to fill with the pliable material.

Figure 2:
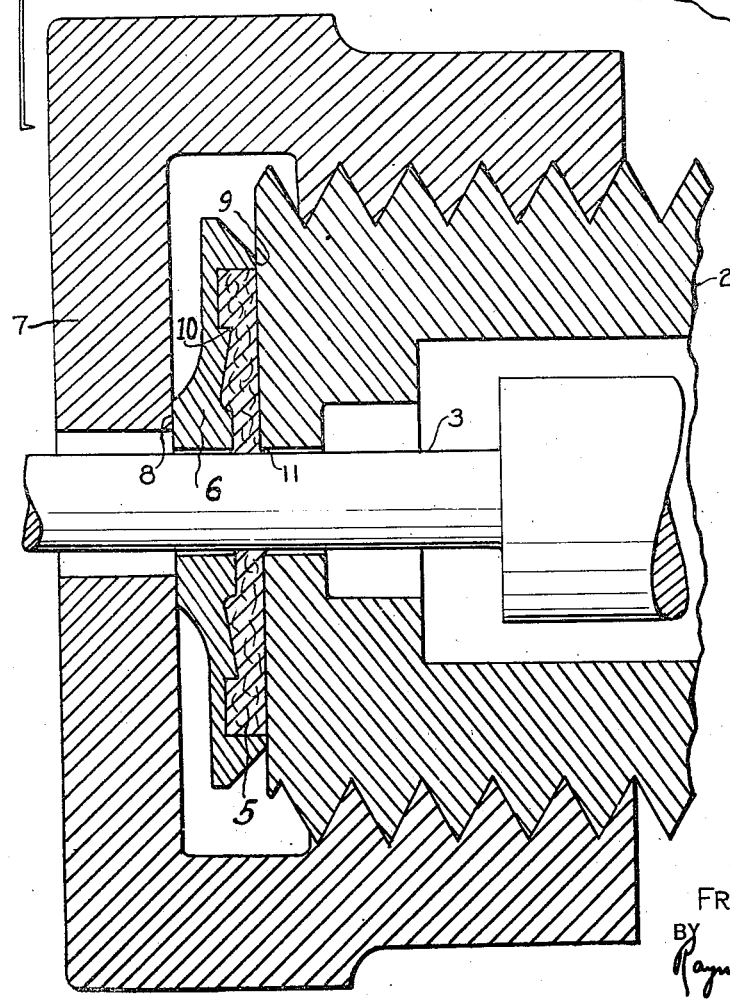
Fig. 2 illustrates to a greatly enlarged scale, a sectional showing of a part of Fig. 1 embodying the invention.

A primary or preferred arrangement of my invention is one wherein the bearing piece 5 is to all intents completely surrounded or confined on all sides. On the one surface by the end of the bearing body 2, on the opposite surface by the follower 6, and completely confining it at its outermost edge by the end wall or periphery of the follower 6. The remaining area constitutes that in contact with the spindle 3 and it will be observed that the only unconfined space or area of the piece 5 is that on both sides of the piece 5, surrounding the spindle 3, and at the clearance of the body 2 and follower 6 with the spindle 3. Such clearance, however, is a matter of a few thousandths of an inch, which is greatly exaggerated in the showing of Fig. 2, which is approximately ten times the actual size of the parts; the parts in Fig. 1 being approximately full or normal constructional size. It is, therefore, apparent that the clearance between the spindle 3 and the parts 2 and 6 of Fig. 2 is very small in actual practice, and shown to greatly enlarged scale in Fig. 2.

The actual bearing for the spindle 3 is, then, a substantially disc shaped piece of pliable material substantially completely confined to prevent its lateral movement away from the spindle 3, which would tend to enlarge the hole in which the spindle bears and permit fluid pressure from within the casing 1 to pass around the spindle to the atmosphere. I have found, and believe, that the success of such a pressure-tight bearing depends materially upon a tight three-point contact at the place where the fluid pressure is to be held. This so called three-point contact is the point which I indicate at 11, of joining between the corner of the bearing body 2, the corner of the bearing piece 5, and the spindle 3. Of course, this is not actually a point but is a line surrounding the spindle 3 at the corner of engagement of the piece 5 therewith. The bearing piece 5 must be, and is, held sufficiently in engagement with the body 2 and free from possible spreading or squeezing out away from the spindle 3 so that there is substantially an intimate contact at the point 11 between the three parts mentioned. Of course, there is, as before brought out, a very slight clearance between the spindle 3 and the hole through the body 2 at this point, and it is the possible action of the fluid pressure through this clearance, either between the piece 5 and the end of the body 2, or else between the piece 5 and the spindle 3, that must be guarded against.

Prior attempts have been made to confine a bearing piece 5 within a recess of a follower 6, but these have been relatively unsatisfactory. I attribute the success of my improved pressure-tight bearing to a great extent to the design of the follower 6, which permits not only a confining of the piece 5 on all sides but a high concentration of pressure upon the piece 5 at an annulus immediately surrounding its engagement with the spindle 3. Furthermore, the design permits the tightening down of the cap 7 without tending to move the follower 6 and the bearing piece 5 in any respect relative to the spindle 3 for distortion of the bearing hole.

In my improved pressure-tight bearing there is no stuffing gland action tending to push or crowd the bearing piece 5 into closer engagement or contact with the spindle, but there is a highly concentrated pressure applied to the bearing piece parallel to the axis of the spindle and closely adjacent the spindle, in a manner to minimize distortion of the hole in the bearing piece and to minimize the possibility of fluid pressure from within the casing 1, forcing a passage in any respect around the spindle 3 to the atmosphere.

It will be understood that I have illustrated and described only one preferred form of my invention and the same may be accomplished with other materials and in other shapes or ways, and that I am to be limited only as to the claims in view of prior art.

What I claim as new, and desire to secure by Letters Patent of the United States, is:—

1. A pressure-tight bearing for an angularly movable spindle extending to the atmosphere through the wall of a casing within which is a pressure other than that of the atmosphere, comprising a disc shaped piece of pliable material snugly fitting said spindle, a metallic follower having a recess receiving said disc, a cap for forcing said follower and disc toward the casing, and means on the follower engaged by said cap for concentrating pressure on the pliable material at an area closely adjacent the engaging surface of the disk with the spindle.

2. A pressure-tight bearing comprising in combination, a spindle, a body member having a flat surfaced end provided with an axial opening loosely fitting said spindle, a disc of pliable material having an axial opening closely fitting said spindle, a metallic disc having an opening slightly greater than the spindle and recessed for entry of said disc of pliable material, means for urging said disc of pliable material toward said flat surfaced end and means for concentrating the pressure of said first means at an area immediately adjacent the engagement of the pliable material with the spindle.

3. A pressure-tight bearing for a spindle passing through the wall of a casing, comprising in combination, a relatively thin piece of pliable material snugly fitting and providing the bearing for the spindle, a recessed member adapted to cooperate with the wall of the casing to completely confine the bearing piece around the spindle, and means for decreasing the volume of bearing containing recess immediately adjacent the spindle to produce a concentration of pressure on the bearing piece only immediately adjacent the spindle.

4. A pressure-tight bearing for a spindle, comprising a relatively thin piece of pliable material snugly fitting the spindle, a recessed container for the pliable piece having spring characteristics, and means for exerting pressure upon said container closely adjacent and surrounding the spindle, whereby the pressure exerted by said means causes a decrease in recess volume closely adjacent and surrounding the spindle.

5. A pressure-tight bearing comprising in combination, a pressure containing casing, a spindle extending through an opening in the wall of said casing, a bearing piece of flexible material snugly surrounding said spindle, a recessed, flexible, follower receiving said flexible material and engaging the wall of the casing at a plurality of points, and means for urging that portion of the follower immediately adjacent the spindle toward said wall whereby a concentration of pressure on the flexible material immediately adjacent the spindle is produced.

FREDERICK A. BARNES.